O. KAMPFE.
TRAP.
APPLICATION FILED MAR. 14, 1919.

1,326,662.

Patented Dec. 30, 1919.

INVENTOR
Otto Kampfe
BY
HIS ATTORNEYS

UNITED STATES PATENT OFFICE.

OTTO KAMPFE, OF BELLMORE, NEW YORK, ASSIGNOR OF ONE-HALF TO HENRY C. WALKER, OF BOSTON, MASSACHUSETTS.

TRAP.

1,326,662.  Specification of Letters Patent.  Patented Dec. 30, 1919.

Application filed March 14, 1919. Serial No. 282,630.

*To all whom it may concern:*

Be it known that I, OTTO KAMPFE, a citizen of the United States, residing at Bellmore, in the county of Nassau and State of New York, have invented an Improvement in Traps, of which the following is a specification.

This invention relates to a trap and it is particularly designed as a mouse trap, although as will be understood depending upon the size or proportion of the parts, the structure may be used as a trap to catch rats or other animals. I am aware that heretofore various forms of traps have been used in some of which the mice or other animals to be caught are killed when trapped, and in other instances the mice or other animals are caught alive. In the former instances there is the objection of removing the dead animal from the trap, while in the latter cases there is the objection of removing and having to dispose of a live animal. The object of my present invention is the provision of an inexpensively constructed positively acting trap in which the mice or other animals are to be caught alive, and in the use of which when caught, the trap entire may be thrown for example into a bucket of water to drown the animal which has been caught, thereby overcoming the difficulty heretofore experienced in disposing of animals when caught alive in various forms of traps.

In carrying out my invention the improved trap preferably comprises a body member which is suitably apertured not only to permit the interior thereof to be seen, but also to readily admit water to the trap when the same is thrown in a bucket of water. In the body of the trap there is provided an opening and a swinging door adapted to close the opening together with means for normally holding the door in the position in which the opening is uncovered, and which means when tripped, release the door permitting it to close by gravity or otherwise, and when closed maintain the door in the closed and locked position as will be hereinafter more particularly described.

Figure 1:
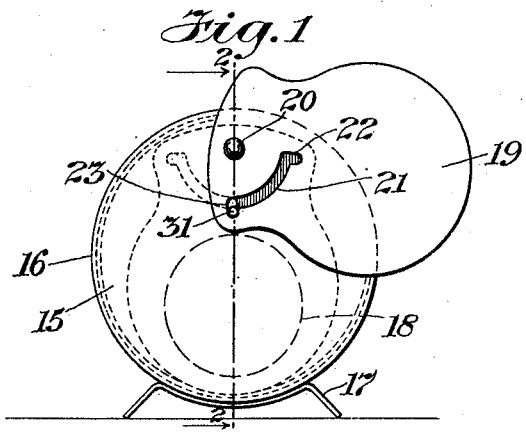
Figure 1 is a view of the forward end of my improved trap.
Figure 2:
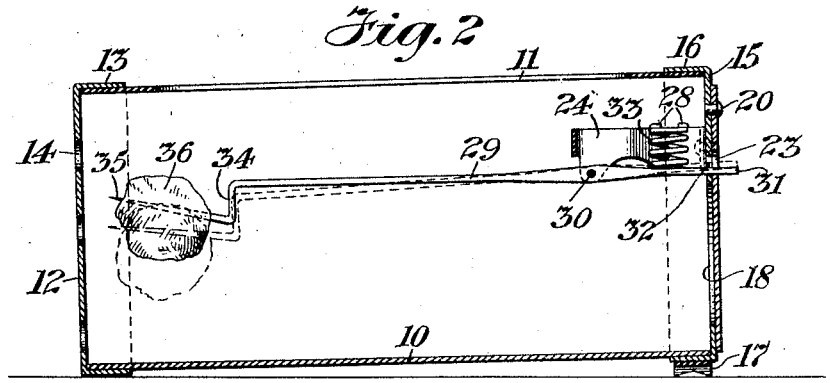
Fig. 2 is a central longitudinal cross section taken on line 2—2 Fig. 1.
Figure 3:
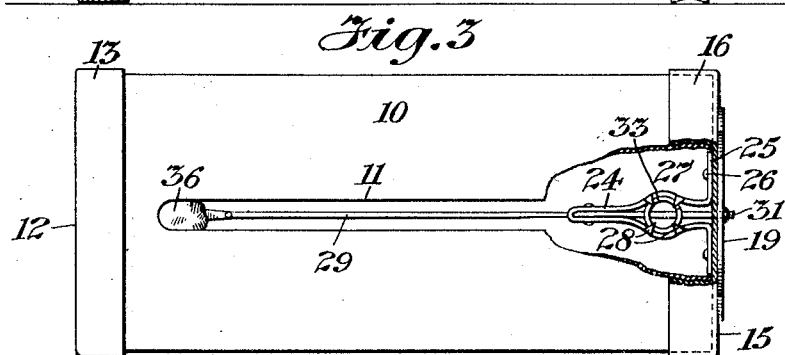
Fig. 3 is a plan and partial cross section illustrating the rod and the manner in which the same is mounted in the trap.
Figure 4:
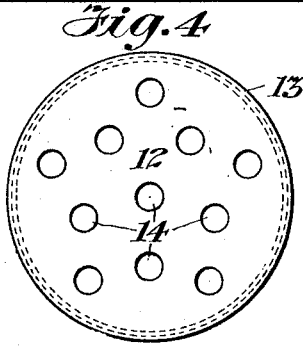
Fig. 4 is a view of the opposite end of the trap.

Referring to the drawing, my improved trap preferably comprises a body member 10 which may be made cylindrical in form and of metal or any other suitable material. This is provided with a longitudinal slot 11 preferably extending to points adjacent the end of the body member so that through the slot the interior of the body may be readily seen. At one end the body member is provided with a removable cap 12 having a flange 13 fitting over the end of the body member and provided with a plurality of holes 14. The opposite or forward end of the body member is also provided with a cap indicated at 15 and having a flange 16 adapted to fit over this end of the body member. Secured to the flange 16 there is a foot or rest member 17 employed to maintain the trap in proper position for use and to slightly elevate the forward end thereof, and in the cap 15 there is an opening 18 through which the mouse or other animal enters the trap. I also employ a door 19 which is pivotally connected to the cap 15 as indicated at 20. In this door there is a slot 21 made on the arc of a circle, the center of which is the pivotal point 20, while at the ends of the slot 21 there are offset portions indicated at 22 and 23 for purposes hereinafter described.

Secured to the inner face of the cap 15, I employ a looped bracket 24, the flanges 25 of which are connected to the cap 15 by rivets 26 or otherwise. The oppositely disposed parts of this bracket are suitably curved in similar positions as indicated at 27 and at their upper edges fitted with spaced fingers 28. Pivotally connected in the bracket 24 is a rod 29, the pivotal point between these parts being indicated at 30. The outer or forward end 31 of the rod 29 passes through an opening 32 provided therefor in the cap 15, and extends through the slot 21 in the door 19. Within the oppositely disposed curved portions of the bracket 24 I employ a helical or other spring 33 one end of which as will now be apparent is in contact with the fingers 28, and the opposite end of which bears against the forward end of the rod 29 or that portion thereof lying between the pivotal point 30 and the cap 15, in order to maintain the end 31 of the rod in contact with the distant surface defining the slot 21 and depending upon the position of the door causing this end of the rod to enter the offset end 23 of the recess to maintain the door in an open position or to enter the offset end 22 of the slot to maintain the door 19 in a closed and locked position. The opposite or inner end of the rod 29 may be bent as indicated at 34 and the extremity thereof terminates in a point 35 to receive and maintain in position the bait 36 to be used in trapping the mouse or other animal.

As will now be apparent in the use of the hereinbefore described trap, either or both covers may be readily removed and the bait placed upon the pointed end of the rod. Also that the door may be swung to the position shown in Fig. 1 when the spring 33 causes the end 31 of the rod to enter the offset portion 23 of the slot to maintain the door in the position in which the opening 18 is uncovered. Also when the mouse or other animal enters the trap and attempts to carry away or eat the bait, by so doing the rod 29 will be moved, the inner end being lowered thereby raising the outer end adjacent the spring 33 which will move this end from the offset extremity of the slot thereby releasing the door and permitting it to close by gravity by swinging from the full line position in Fig. 1 to the dotted line position therein. Then as will be understood, the action of the spring 33 against the end of the rod will cause the same to enter the offset end of the slot 21 to lock the door in a closed position. It will be furthermore understood that when the mouse or other animal is thus caught in the trap, the trap may be thrown into a bucket of water and the animal drowned.

I claim as my invention:

1. A trap comprising a body member having an opening therein, a door connected to the body member and adapted to move to cover and uncover the opening therein, a rod pivotally mounted within the body member and extending through a slot in the said door, and means coacting with the said rod to force the same into the end of the slot in the door to maintain the door in a position in which the opening in the body member is uncovered and also to force the rod into the opposite end of the slot to maintain the door in a position in which it covers the opening in the body member.

2. A trap comprising a cylindrical body member having an opening therein, a door pivotally mounted to the said body member so as to swing to cover and uncover the opening therein, a rod pivotally mounted within the body member and extending through a hole therein and also through a slot in the said door, and means coacting with the said rod to force the same into the end of the slot in the door to maintain the door in a position in which the opening in the body member is uncovered and also to force the rod into the opposite end of the slot to maintain the door in a position in which it covers the said opening in the body member.

3. A trap comprising a cylindrical body member, a removable cap fitting one end thereof and having an opening therein, a door pivotally connected to the said cap so as to swing to cover and uncover the opening therein, a rod pivotally mounted within the cylindrical body member and extending through an opening in the said cap and also a slot in the said door, and means coacting with the said rod to force the same into an offset end of the said slot in the door to maintain the door in a position in which the opening in the cap is uncovered and also to force the said rod into an offset portion in the opposite end of the said slot to maintain the door in the position in which it covers the said opening in the cap.

4. A trap comprising a cylindrical body member having a longitudinal recess therein, a cap adapted to fit an end of the said body member and having an opening therein, a door pivotally mounted on the said cap and adapted to swing to position to cover and uncover the said opening, a bracket secured to the inner surface of the said cap, a lever pivotally mounted in the said bracket and at one end extending through an opening provided therefor in the said cap and also through a slot in the said door, and means for maintaining the end of the said lever in contact with the distant surface defining said slot so as to cause the same to enter an offset portion at one end of the slot to maintain the door in a position in which the opening in the cap is uncovered and also to enter an offset portion at the other end of the slot to lock the door in place when in position to cover the opening in the said cap.

5. A trap comprising a cylindrical body member having a longitudinal recess therein, a cap adapted to fit an end of the said body member and having an opening therein, a door pivotally mounted on the said cap and adapted to swing to position to cover and uncover the said opening, a bracket secured to the inner surface of the said cap, a lever pivotally mounted in the said bracket and at one end extending through an opening provided therefor in the said cap and also through a slot in the said door, and a spring fitting within curved portions of the said bracket and bearing against the end of the said rod which passes through the cap and door to maintain this end of the rod in contact with the distant surface defining said slot in the door so that the rod enters an offset portion of the slot at one end thereof to maintain the door in position with the opening in the cap uncovered and also enters an offset portion at the opposite end of the slot to maintain the door in position with the opening in the cap covered.

Signed by me this 11th day of March, 1919.

OTTO KAMPFE.